United States Patent [19]

Kano et al.

[11] Patent Number: 4,930,877
[45] Date of Patent: Jun. 5, 1990

[54] LIQUID CRYSTAL DISPLAY

[75] Inventors: Mitsuru Kano, Furukawa; Kenji Miyagawa, Nagoya; Masahiko Yamaguchi; Eiji Imaizumi, both of Furukawa, all of Japan

[73] Assignee: Alps Electric Co., Ltd., Tokyo, Japan

[21] Appl. No.: 263,468

[22] Filed: Oct. 27, 1988

[30] Foreign Application Priority Data

Feb. 23, 1988 [JP] Japan ................................. 63-40486

[51] Int. Cl.$^5$ ............................................. G02F 1/13
[52] U.S. Cl. ................................ 350/339 F; 350/337; 350/347 E
[58] Field of Search ............... 350/347 E, 346, 339 F, 350/337

[56] References Cited

U.S. PATENT DOCUMENTS

| | | | |
|---|---|---|---|
| 4,527,864 | 7/1985 | Dir | 350/337 |
| 4,653,861 | 3/1987 | Kando et al. | 350/337 |
| 4,653,865 | 3/1987 | Kando et al. | 350/347 E X |
| 4,664,482 | 5/1987 | Kando et al. | 350/337 X |
| 4,693,562 | 9/1987 | Hasegawa et al. | 350/337 |
| 4,759,612 | 7/1988 | Nakatsuka et al. | 350/337 |

FOREIGN PATENT DOCUMENTS

| | | | |
|---|---|---|---|
| 0100761 | 8/1979 | Japan | 350/337 |
| 0090618 | 6/1982 | Japan | 350/337 |
| 0162226 | 8/1985 | Japan | 350/337 |
| 0091629 | 5/1986 | Japan | 350/337 |
| 0279315 | 12/1987 | Japan | 350/337 |

OTHER PUBLICATIONS

Scheffer et al., "Optimum Polarizer Combinations for Twisted Nematic Display", Conference Report, Oct. 1976, pp. 53-60.

Mada et al., "Electro-Optical Properties of Twisted Nematic Liquid Crystal an Application to Voltage Controllable Color Formation", Physic Abstracts 2.420-7.130, May 1975.

"Electro-Optical Performance of a New, Black-White and Highly Multiplexable Liquid Crystal Display", (Appl. Phys. Lett. 50(5), 2 Feb. 1987).

Primary Examiner—Stanley D. Miller
Assistant Examiner—Huy K. Mai
Attorney, Agent, or Firm—Guy W. Shoup; Paul J. Winters

[57] ABSTRACT

A liquid crystal display includes a pair of substrates and a liquid crystal composition sealed between the substrates. The liquid crystal composition has a twist angle set within a range of 180-300 degrees and a retardation set within a range of 0.45-0.7, wherein when an electric field is applied, the liquid crystal display is in a dark state, while when the electric field is not applied, the liquid crystal display is in a bright state. A filter is laminated on the outside of the substrates, and it has a hue complementary to that of an image color of the liquid crystal display in the bright state.

1 Claim, 2 Drawing Sheets

LIQUID CRYSTAL DISPLAY

BACKGROUND OF THE INVENTION

The present invention relates to a liquid crystal display which can simultaneously realize clear black-white images and high-density information images.

As a TN (Twisted Nematic) liquid crystal display has some problems such that a visual angle is narrow and that it is disadvantageous for multiplexing drive, there has been proposed a SBE (Supertwisted Birefringence Effect) liquid crystal display.

However, since the SBE liquid crystal display exhibits yellow or blue images, the following attempts have been made so as to convert the yellow or blue images into the black-white images.

(1) Optical Mode Interference OMI Mode

A retardation ($\Delta nd$) conventionally set at 0.8-0.9 is set to about 0.5-0.6, and a twist angle of liquid crystal molecules is set to a proper value within a range of about 180-300 degrees. Further, other parameters such as polarizing plate configuration and d/p (d=liquid crystal cell gap; p=twist pitch) are set to optimum values. (M. Schadt et al., Appl. Phys. LCH., 50(20), 236 ('87))

(2) Guest Host GH Mode

Each parameter is set to an optimum value so that the SBE liquid crystal display may exhibit a high contrast in a blue mode of negative images, and a large amount (several %) of a dichromatic coloring matter of black is added to a liquid crystal composition, so as to obtain black-white images. (Nikkei Microdevice, p79-, October, 1987)

(3) Phase Plate Mode

On the SBE liquid crystal display developing a high contrast, a non-display SBE cell having a twist direction reverse to that of the SBE liquid crystal display is laminated.

However, these attempts as mentioned above still have the following disadvantages.

In the OMI mode liquid crystal display, it is greatly difficult to simultaneously realize the improvement in definition of the black-white images and the increase in density of the images. Accordingly, it is obliged to slightly sacrifice both the definition and the density of the images, resulting in a slightly bluish coloring of the images.

In the GH mode liquid crystal display, it is necessary to add a large amount of dichromatic coloring matter. As a result, the images are dark, and there is a possibility of the coloring matter being deposited at low temperature. Additionally, the images are basically in the negative mode.

In the phase plate mode liquid crystal display, the manufacturing cost is increased, and the visual angle characteristics are unexpectedly inferior. Furthermore, similar to the GH mode liquid crystal display, the images in the phase plate mode liquid crystal display are basically in the negative mode.

SUMMARY OF THE INVENTION

Accordingly, it is a first object of the present invention to provide a liquid crystal display which may basically exhibit positive mode images and simultaneously realize clear black-white images and high density of the images.

It is a second object of the present invention to provide a liquid crystal display which may attain bright images and eliminate the possibility of the deposition of the coloring matter.

It is a third object of the present invention to provide a liquid crystal display which is improved in visual angle characteristics and may be manufactured at a low cost.

The liquid crystal display of the present invention is constituted basically of the OMI mode liquid crystal display, and a filter is laminated on the OMI mode liquid crystal display. The filter has a hue complementary to that in a bright or off state of the liquid crystal display.

According to the present invention, in order to improve a $\gamma$ characteristic indicative of an index of high information density and a contrast, various parameters such as retardation, twist angle of liquid crystal molecules, configuration of polarizing plate, d/p and material constant are set to optimum values in the basic OMI mode. The $\gamma$ characteristic is represented by $\gamma = V_{90}/V_{10}$ (where $V_{90}$ and $V_{10}$ stand for applied voltages when light transmittances are 90% and 10%, respectively).

In setting the parameters of the liquid crystal display primarily from the viewpoints of the $\gamma$ characteristic and the contrast, the twist angle of the liquid crystal molecules is set to a proper value within a range of 180-300 degrees, and the retardation is set to a proper value within a range of 0.45-0.7.

The OMI liquid crystal display obtained in this stage normally exhibits colored images of blue-green close to white in the region where no electric field is applied.

According to the present invention, a filter is laminated on the OMI liquid crystal display. The filter to be used has a hue complementary to that of the image color in the off state of the OMI liquid crystal display, that is, in the region where no electric field is applied, in consideration of spectral characteristics of the image color in the off state. For example, in the case that the image color in the region of the OMI liquid crystal display where no electric field is applied is blue-green, the filter having a hue of orange-red is used.

Although the filter may be interposed between the substrate and the polarizing plate, it is preferably laminated on the outside surface of the polarizing plate. Specifically in a transmissive liquid crystal display, the filter is preferably laminated on the polarizing plate on the side of a light source.

As mentioned above, the liquid crystal display of the present invention is constituted basically of the OMI liquid crystal display exhibiting positive images, and the filter is laminated on the outside of the OMI liquid crystal display. The filter has a hue complementary to that of the image color of the OMI liquid crystal display in the off state. Accordingly, as shown in FIG. 1, light having a wavelength range less absorbed by the OMI liquid crystal display is absorbed by the filter. As a result, an image color of the liquid crystal display according to the present invention in the region where no electric field is applied is less dependent upon the wavelength of light.

Other objects and features of the invention will be more fully understood from the following detailed description and appended claims when taken with the accompanying drawings.

DETAILED DESCRIPTION OF THE PREFERRED EMBODIMENTS

(EXAMPLES 1–3)

Figure 1:
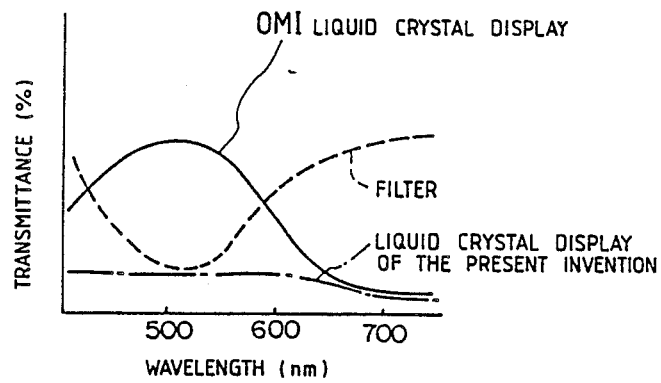
FIG. 1 is a spectral characteristic graph illustrating the operation of the liquid crystal display according to the present invention.
Figure 2:
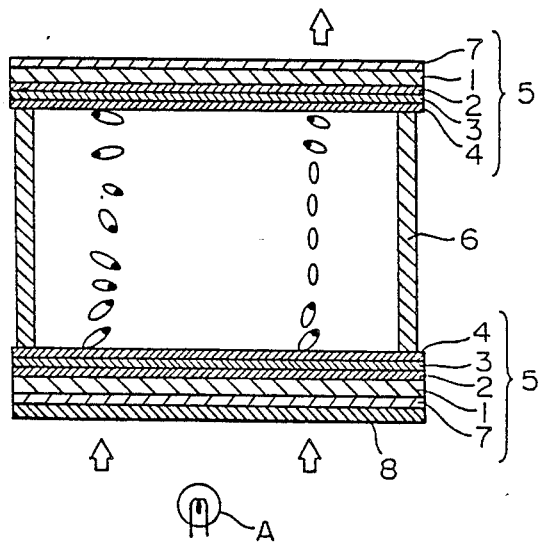
FIG. 2 is a sectional view of the liquid crystal display to be prepared in the preferred embodiments.

The liquid crystal display according to the present invention as shown in FIG. 2 was prepared to investigate black-white image quality, $\gamma$ characteristic, contrast ratio and visual angle characteristic.

The liquid crystal display includes a liquid crystal cell constituted of a pair of substrates 5 bonded to each other by a seal 6. Each substrate 5 is constituted of a smooth glass plate 1, a passivation film 2, a patterned transparent electrode 3 and an orientation film 4 mutually laminated in this order. A pair of polarizing plates 7 are laminated on the opposite outside surfaces of the liquid crystal cell, and a filter 8 is laminated on the polarizing plate 7 on the side of a light source A.

The liquid crystal display was prepared as follows:

First, the passivation films 2 and the transparent electrodes 3 (formed of indium-tin oxide) were formed on the glass plates (commercially available SBE substrates) 1. Then, a polyimide resin (SE-4110 produced by Nissan Kagaku K.K.) was printed on the glass plates 1. Then, the glass plates 1 were heated at 300° C. for 30 minutes to form the orientation films 4. Then, the orientation films were rubbed so that a left-handed helical twist angle of liquid crystal molecules may be 240 degrees. Then, a spherical spacer formed of silica was scattered onto one of the substrates 5, and a predetermined pattern of adhesive as the seal 6 was printed on the substrate 5. Thereafter, the two substrates 5 were bonded to each other to prepare a liquid crystal cell having a cell gap of 7 micrometers.

On the other hand, liquid crystal compositions as shown in Table 1 were prepared. As a host liquid crystal, AP-4601xx (produced by Chisso K.K.; birefringence $\Delta n = 0.085$ was used, and 0.7% of chiral additive S-811 (produced by Merck & Co., Inc) was added to the host liquid crystal. Each liquid crystal composition was filled into the liquid crystal cell, and the cell was sealed by an epoxy adhesive (Semedain Hisuper 30 produced by Semedain). In filling the cell with the liquid crystal compositions prepared above, $\Delta nd$ was about 0.595 and $d/p$ was about 0.54. Then, upper and lower polarizing plates 7 (NPF-G1225DU produced by Nitto Denko K.K.) were attached to the cell.

Figure 3:
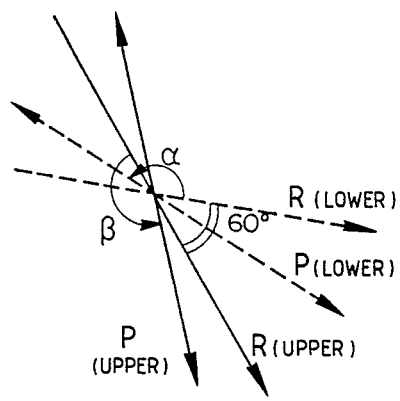
FIG. 3 is a schematic illustration of a deciding method for polarizing plate configuration to be described in Example 1.

Angles of polarizing axes of the polarizing plates were decided as rotating the polarizing plates so that the liquid crystal display may exhibit the positive images and the $\gamma$ value as an index of high-density information images and the contrast may be satisfactory. The configration of the polarizing plates as decided was such that the angles of polarizing axes P(upper) and P(lower) of the upper and lower polarizing plates relative to upper and lower rubbing axes R(upper) and R(lower) denoted by $\beta$ and $\alpha$, respectively, as shown in FIG. 3, $(\beta,\alpha) = (60°, 30°)$ was set.

Figure 4:
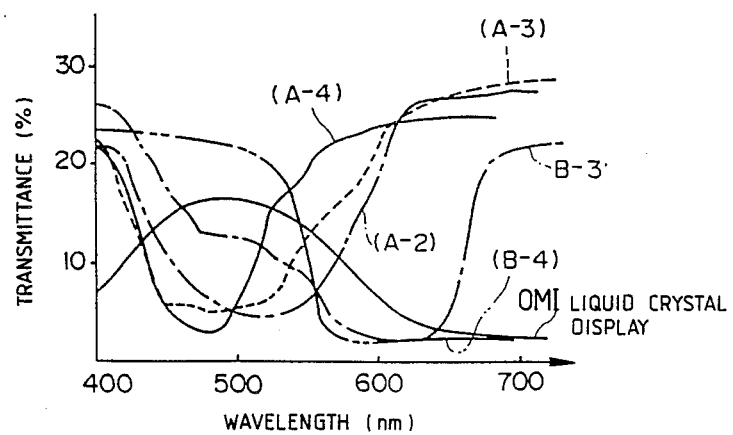
FIG. 4 is a spectral characteristic graph of the filters to be used in the preferred embodiments.

A spectral characteristic of the OMI liquid crystal display prepared above is shown in FIG. 4.

Then, filters (A-3), (A-2) and (A-4) were laminated on the OMI liquid crystal displays prepared above to obtain the liquid crystal displays in Examples. The filter numbers correspond to those described in a Color Filter Sample Book 20, 1980 produced by Tokyo Butai Shomei K.K. On the other hand, filters (B-3) and (B-4) were laminated on the OMI liquid crystal displays to obtain liquid crystal displays as Comparisons 2 and 3.

Using the liquid crystal displays prepared above, the following tests were conducted.

(1) Black-White Image Quality

Using a daylight fluorescent lamp as a back light source under the condition where no electric field was applied, color of the liquid crystal displays was measured by a colorimeter (BM-5 produced by Tokyo Kogaku K.K.) and it was also visually determined. The total determination of black-white quality is shown in Table 1. Referring to Table 1, Column of Black-White Image Quality, O represents that the image color was visibly recognized as a black-white image; $\Delta$ represents that the image color was felt to just have the other color; and $\times$ represents that the image color was not a black-white image apparently.

(2) $\gamma$ characteristic

The liquid crystal displays were statically driven by applying a voltage of 1 KHz to investigate electro-optical characteristics of the liquid crystal displays and compare values.

Referring to Table 1, Column of $\gamma$ characteristic, O represents $\gamma < 1.1$; $\Delta$ represents $1.1 \leq \gamma < 1.2$ and $\times$ represents $1.2 \leq \gamma$.

(3) Contrast

The liquid crystal displays were driven at a duty ratio of 1/100, and contrast ratios (Ct) were measured in a direction at an angle of 10 degrees relative to a normal to the substrates. Averages of the contrast ratios were compared.

Referring to Table 1, Column of Contrast, O represents $7.5 < Ct$; $\Delta$ represents $5 < Ct \leq 7.5$; and $\times$ represents $Ct \leq 5$.

(4) Visual Angle

Referring to Table 1, Column of Visual Angle, O represents that an angle capable of keeping $Ct \geq 5$ was greater than $\pm 40$ degrees; $\Delta$ represents that this angle was not greater than $\pm 40$ degrees; and $\times$ represents that this angle was not greater than $\pm 20$ degrees.

It is appreciated from Table 1 that the liquid crystal displays having the filters (A-3), (A-2) and (A-4) having a hue of orange-red complementary to that of the light blue image color under the condition where no electric field was applied could exhibit clear black-white images.

To the contrary, the liquid crystal displays of the Comparisons 2 and 3 having the filters (B-3) and (B-4) having a hue of blue could not exhibit good black-white images.

(EXAMPLES 4–8)

The liquid crystal displays shown in the lower column of Table 1 were prepared in the same manner as in Examples 1–3, and the same test was conducted. The test result was similar to that in Examples 1–3.

It was recognized from Examples 1–8 that when $\Delta nd \approx 0.45$–$0.7$ and $d/p \approx 0.45$–$0.7$ were set, clear black-white images could be realized without sacrificing the other characteristics.

TABLE 1

|  | Host liquid crystal | Δn | d(μm) | Δnd | Twist angle (°) | Filter Nos. | Black-white image quality | γ-characteristic | Contrast | Visual angle |
| --- | --- | --- | --- | --- | --- | --- | --- | --- | --- | --- |
| Example 1 | AP-4601xx (Produced by CHISSO K. K.) | 0.085 | 7.0 | 0.595 | 240 | A-3 | O | O | O | O |
| Example 2 | AP-4601xx | 0.085 | 7.0 | 0.595 | 240 | A-2 | O | O | O | O |
| Example 3 | AP-4601xx | 0.085 | 7.0 | 0.595 | 240 | A-4 | O | O | O | O |
| Comparison 1 | AP-4601xx | 0.085 | 7.0 | 0.595 | 240 | — | Δ~X | O | O | O |
| Comparison 2 | AP-4601xx | 0.085 | 7.0 | 0.595 | 240 | B-3 | X | Δ | Δ | Δ |
| Comparison 3 | AP-4601xx | 0.085 | 7.0 | 0.595 | 240 | B-4 | X | Δ | Δ | Δ |
| Example 4 | AP-4602xx (Produced by CHISSO K. K.) | 0.083 | 6 | 0.498 | 240 | A-3 | O | O | O | O |
| Example 5 | AP-4602xx | 0.083 | 7 | 0.581 | 240 | A-2 | O | O | O | O |
| Example 6 | AP-4602xx | 0.083 | 5.5 | 0.46 | 240 | A-3 | O | O | O | O |
| Example 7 | AP-4602xx | 0.083 | 6 | 0.498 | 180 | A-4 | O | O | O | O |
| Example 8 | AP-4603xx (Produced by CHISSO K. K.) | 0.105 | 6 | 0.63 | 270 | A-3 | O | O | O | O |

Note:
The filter numbers correspond to the sample numbers described in Color Filter Sample Book 20, 1980 by Tokyo Butai Shomei K. K.

(EXAMPLE 9)

A plurality of liquid crystal cells having twist angles 180, 200, 225, 270 and 300 degrees were prepared, and the same tests as in Examples 1-8 were conducted. Each cell could realize clear black-white images.

It was realized from the test result that the twist angle could be set to a proper value within a range of 180-300 degrees. If the twist angle exceeds 300 degrees, the uniformity of orientation of the liquid crystal molecules is damaged to result in no practical use.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A liquid crystal display comprising a pair of substrates; a liquid crystal composition sealed between said substrates, said liquid crystal composition having a twist angle set within a range of 180-300 degrees and a retardation set within a range of 0.45-0.7 μm, wherein when an electric field is applied, said liquid crystal display is in a dark state, while when the electric field is not applied, said liquid crystal display is in a bright state; and a filter laminated on the outside of said substrates, said filter having a hue complementary to that of an image color of said liquid crystal display in the bright state.

* * * * *